July 22, 1958 — C. W. BRYANT — 2,844,021

VALVE LOCKING DEVICE

Filed April 29, 1955

Inventor:
Corwin W. Bryant.

United States Patent Office 2,844,021
Patented July 22, 1958

2,844,021

VALVE LOCKING DEVICE

Corwin W. Bryant, Downers Grove, Ill., assignor to Crane Co., Chicago, Ill., a corporation of Illinois Application April 29, 1955, Serial No. 504,720

10 Claims. (Cl. 70—175)

This invention relates generally to a valve locking means, and, more particularly, it is concerned with the type of locking device in which in the locked position the handwheel or other rotatable valve actuating means is rendered free spinning.

In order to obtain a better appreciation concerning the merits of this invention, it should be understood that heretofore in connection with certain types of manufacturing, processing, machine operators, food processing, handling chemicals and other critical services, it has been desirable to lock the valve in a sturdy and compact manner against tampering or any other unauthorized handling of line control mechanisms.

It should also be understood that heretofore previous devices have employed hasps, chains, and locks in combination therewith to hold or restrain the handwheel rigidly. However, in numerous cases it has been found that such locking mechanisms may be tampered with and the valve operated without a great deal of effort or actual violence may be employed to the extent of applying a wrench or a wrecking bar to overcome the restraining effect of the locking device.

Therefore, one of the more important objects of this invention is to provide the type of locking means which cannot be successfully subjected to wrenches for such purpose.

Another object is to provide a locking device which when combined with a yoke sleeve or other suitable journalling means for the actuating member can be entirely enclosed.

Another object is to provide for a locking construction in which regular valve parts except for the handwheel can be conveniently employed.

A further object is to provide a type of valve locking mechanism cooperating with a driving handwheel mounted on a yoke sleeve in which a lock carrying lug with the lock can be moved into position to lock the yoke sleeve with the yoke through a driving ring and thereby to connect the handwheel or other rotatable actuating member with the yoke sleeve through the said driving ring.

Another object is to provide for a simple construction having relatively few parts and permitting the employment of heavy and substantial locking means to securely hold the assembly and without relatively light or fragile latches being exposed.

Other objects and advantages will become more readily apparent upon proceeding with the description read in light of the accompanying drawings, in which Fig. 1 is a fragmentary sectional assembly view of the locking mechanism in which position the handwheel is freely rotatable to render the valve in an inoperative condition.

Similar reference numerals apply to similar parts throughout the several figures.

Figure 1:
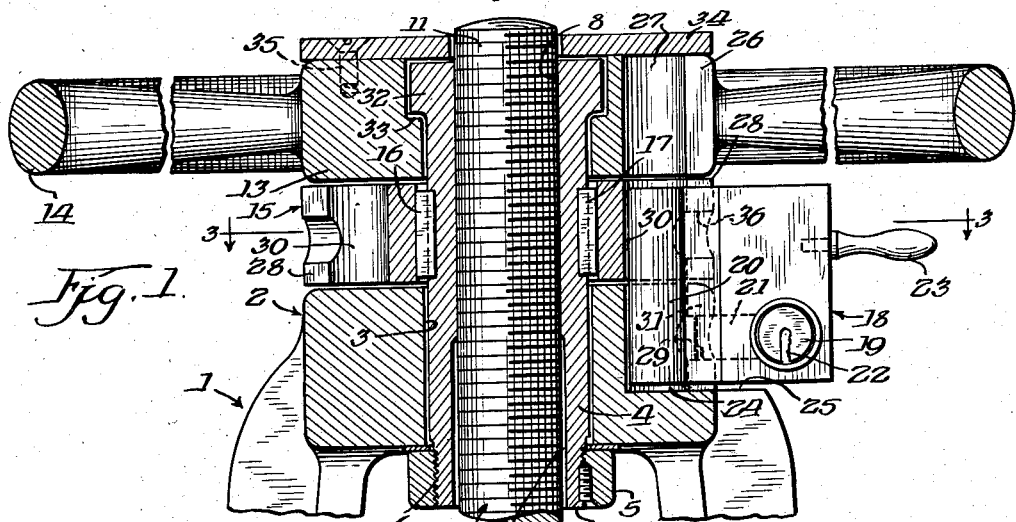

Referring now to Fig. 1, a valve yoke of the type employed in connection with either a gate valve or a globe valve, such as that designated as catalog No. 20–E or 22–E on page 110 of Crane Co.'s No. 53 Catalog is shown generally designated as 1. It is attached by the usual bolting means (not shown) to a valve body (not shown), but of the general type referred to. The yoke is provided with a hub at its upper end designated 2 of generally cylindrical configuration which hub is bored as at 3 to receive a yoke sleeve 4, the latter member being held within the yoke by means of the yoke sleeve retaining nut 5 applied to the threads 6. It is preferably held in locked position by means of the set screw 7 as indicated. The yoke sleeve is internally threaded as at 8 to receive the valve stem 9, the latter having the threads 11 and preferably, although not necessarily, the yoke sleeve at 12 at its lower end is counterbored to receive the stem 9.

Beyond the upper portion of the hub 2 and interposed between the upper surface of the latter member and the hub 13 of the handwheel 14, a driving ring generally designated 15 and for reasons hereinafter stated is positioned and held in non-rotatable or locked relation onto the yoke sleeve by means of the keys 16 and 17 preferably positioned diametrically opposite each other.

Cooperating with the driving ring 15 is a lock carrying lug generally designated 18 which is axially movable and provided with the lock latch 19 for the purpose of actuating and locking the slidable plunger 21. The latter member, it should be understood, is selectively retractible upon applying a key at slot 22 to permit such actuation. The lock carrying lug 18 is provided with a suitable handle 23 by means of which after retraction of the plunger 21 outwardly, the said lock carrying lug may then be moved upwardly within the slotted portion 24 (see Fig. 2) of the cut-away area 25 of the hub 2.

Figure 3:
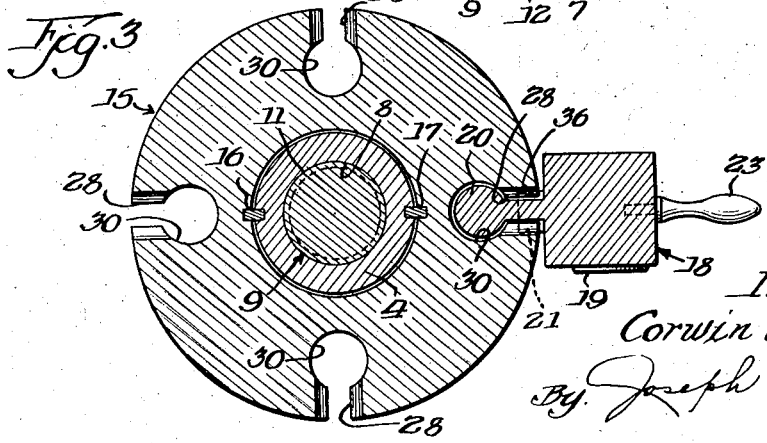
Fig. 3 is a transverse sectional view taken on the line 3—3 of Fig. 1.

The handwheel 14 at its hub 13, as shown at 26, is also suitably slotted and is cut away as at 27 thereby to form a complementary portion of the slot 24 whereby to permit the key portion 20 of lug 18 engaging a similarly slotted portion 28 of the driving ring 15. The slotted portions 28 of the ring 15, as more clearly shown in Fig. 3, may be spaced apart radially and positioned so as to extend completely around the driving ring or in as many quadrants or sectional positions as desired depending upon the nature of the control in the opening of the vale or closing of the valve as may be necessary, for example, if a valve throttling function is required.

The hub of the yoke, as at 29, is bored to receive the lock plunger 21 shown in Fig. 1 and is also slotted above as at 31. Thus, it should be noted that in the handwheel hub 13 and also in the yoke hub 2 only a single slot is necessary for engagement and disengagement of the handwheel and yoke, whereas in the driving ring 15, and as previously stated, while four slots are shown for the reasons above mentioned, a greater or lesser number may be provided to make the lock positioning more flexible. For the plunger 21 to be received in any other aperture in the driving ring 15 than the one shown in engagement therewith in Fig. 2, it is necessary to remove the handwheel 14, the driving ring and the sleeve 4 from the yoke 1 as a unit by removing the nut 5, manually rotate the driving ring so that the desired aperture is in alignment with the aperture in the handwheel and then reinsert the said unit.

Figure 2:
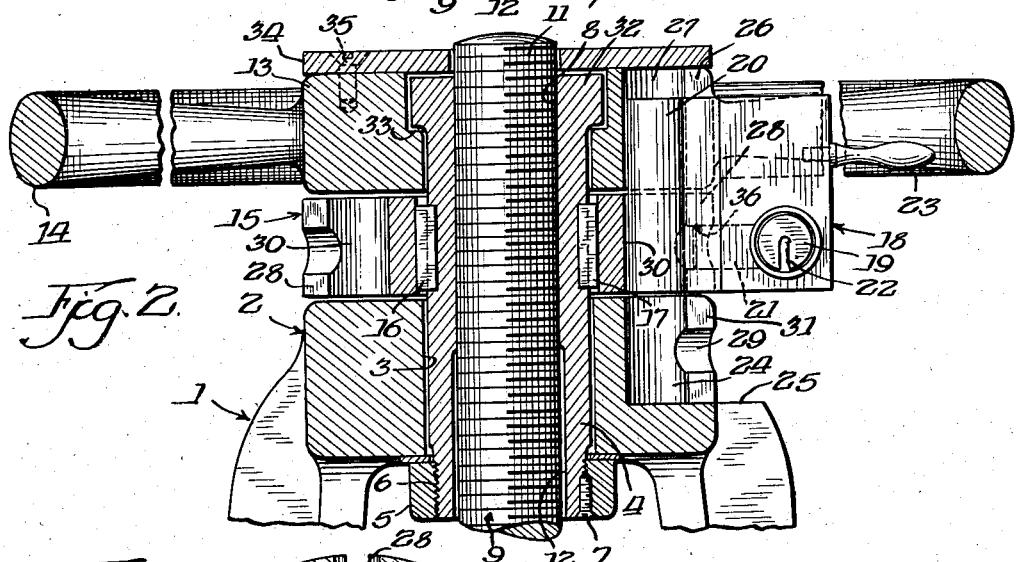
Fig. 2 is a fragmentary sectional assembly view of the structure referred to in Fig. 1, except with the locking means engaging the handwheel so as to thereby permit valve operation.

The radially extending handwheel spokes are of course suitably spaced so as to permit the lock carrying lug to move between the spokes as shown more clearly in Fig. 2. At its upper portion, the yoke sleeve 4 is flanged as at 32 to shoulder within the handwheel as at 33 and hold the handwheel in position in superposed relation upon the driving ring 15. As a cover, to keep out dust and also avoid tampering the assembly plate 34 is mounted over the handwheel hub 13 and the keyway 27 of the handwheel. The latter cover plate may be attached to the hub by suitable annularly arranged screws as indicated at 35.

Thus it will be clear that a relatively simple, compact and sturdy clutch type of locking mechanism has been provided suitable for use with a valve structure or the like. In considering its operation, let it be assumed that preliminary to its being positioned to rotate with the driving ring 15, the handwheel 14 has been rotated so that it assumes the rotative position shown in Fig. 1, in which latter figure it will be clear that the handwheel is freely rotatable relative to the said drive ring as well as to the yoke sleeve 4 rotating around the enlarged portion 32 of the latter member. At this stage, it is then only necessary to insert a key as at 22 and then rotating the usual tumbler of the lock 19 so as to cause the lock plunger 21 to be moved outwardly and thereby disengage the yoke hub aperture 29. Then gripping the handle 23 of the lock carrying lug 18, the latter member is now moved upward until it assumes the position shown in Fig. 2 in which position it will be noted that the lowermost surface of the lug 18 has cleared the top of yoke hub 2. The lock plunger 21 in this position is moved inward and therefore engages the transverse aperture 36 of the driving ring 15. At this stage of actuation, it will be apparent that the handwheel 14 and the said driving ring are rotatable as a unit and by means of the keys 16 and 17 also provide for the simultaneous rotation of the yoke sleeve 4. By rotation of the latter member, the threaded stem will then be caused to move longitudinally upward or downward depending upon the direction of rotation of the said handwheel, the handwheel through the medium of the said driving ring actuating said stem as desired.

For purpose of illustration, only a single embodiment has been shown and described, but of course it should be appreciated that it may assume numerous other forms than that shown. It is the desire, therefore, to be limited only by the scope of the appended claims read in light of the prior art.

I claim:

1. In a valve locking mechanism or the like, the combination of a lock and lock supporting member comprising a yoke, a sleeve therefor rotatable within said yoke, a lock carrying lug having an axially movable locking key portion for the lock, a driving ring rotatable with the sleeve having a side positioned aperture for engagement by the axially movable locking key portion of the said lug, actuating means mounted on the said sleeve for rotation therewith, a shaft engaging said yoke sleeve and being actuated by the said actuating means, said latter means having a hub portion with a laterally extending apertured portion engageable by the said key portion of the lock carrying lug upon predetermined axial movement of the said lug in a direction toward said actuating means whereupon the said driving ring and actuating means are then rotatable as a unit to actuate the said shaft.

2. In a locking mechanism for a valve or the like, the combination of a lock and lock supporting yoke, a rotatable yoke sleeve therefor axially immovable in said yoke, a lock carrying lug normally supported by said yoke and having a locking key portion for the lock, a driving ring non-rotatably mounted relative to said yoke sleeve, the said driving ring having a side positioned aperture for engagement by the locking key portion of the said lug, a handwheel mounted on a projecting portion of the said yoke sleeve, a shaft threadedly journalled within said projecting portion actuated through the driving ring, the said handwheel having a hub portion recessed to receive said yoke sleeve projecting portion and having a radially extending relieved portion engageable by the key portion of the said lock carrying lug upon predetermined axial movement of the said lug in a direction parallel to the central axis of the said shaft, the said handwheel radially extending relieved portion providing that upon predetermined upward movement of the key portion of the lock carrying lug to engage the said hub relieved portion the said handwheel and the yoke sleeve are rotatable together to move said threadedly journalled shaft and operate the valve.

3. In a valve locking mechanism or the like, the combination of a lock and lock supporting yoke, a yoke sleeve therefor in a central portion thereof, a lock carrying lug having an axially movable locking key portion for the lock, a driving ring rotatable with the sleeve and having a laterally positioned aperture for engagement by the said lug locking key portion, a handwheel mounted on the said yoke sleeve, a shaft engaging said yoke sleeve and being actuated by the said handwheel through the driving ring, a hub at a central portion of the hand wheel having an apertured section engageable by the said key portion of the lock carrying lug upon predetermined axial movement of the said lug and upon predetermined axial movement of said locking key portion therewith to allow the said key portion to engage the hub apertured section, whereupon said handwheel and driving ring are movable together as a unit to rotate said yoke sleeve and actuate said shaft.

4. In a locking mechanism of the character described, the combination of a lock and lock supporting yoke, a threaded yoke sleeve therefor, a threaded shaft non-rotatably mounted in the said sleeve, a lock carrying lug having a locking key portion for the lock, a driving ring keyed to said sleeve and having a transversely positioned aperture for engagement by the locking key portion of the said lug, a handwheel mounted on the said threaded sleeve, said threaded shaft engaging said yoke sleeve and being actuated by the said handwheel through said driving ring, the handwheel having a hub portion having a side aperture engageable by the said key portion of the lock carrying lug upon axial movement of the said lug, the said yoke having a lateral apertured portion engageable by the said lug key portion whereby upon respective disengagement of the said key portion from the said handwheel hub and upon engagement of the said key portion with the said yoke the said handwheel is freely rotatable relative to the said yoke sleeve, the threaded shaft and driving ring.

5. In a valve locking mechanism of the character described, the combination of a lock and lock supporting yoke member, a threaded sleeve therefor journalled within said yoke member, a lock carrying lug having a locking key portion for the lock, a driving ring keyed to said sleeve for rotation therewith and having peripherally arranged laterally positioned apertures for engagement by the lug locking key portion, a rotatable means mounted on the said yoke sleeve, a threaded shaft axially movable within the said threaded sleeve and being actuated by the said rotatable means through said driving ring, the said rotatable means having a central portion with a lateral aperture engageable by the said key portion of the lock carrying lug upon predetermined axial movement of the said lug relative to said central portion, the said sleeve being threadedly connected to said shaft and held in non-rotatable relation to the said driving ring.

6. In a valve locking mechanism, the combination of a lock and lock supporting yoke member, a yoke sleeve rotatably mounted in said yoke member, a lock carrying lug having a locking key portion for the lock, a driving ring keyed to said yoke sleeve and having at least one laterally positioned aperture means for engagement by the locking key portion of the said lug, a handwheel predeterminately rotatable or non-rotatable relative to the said yoke sleeve, a shaft axially movable within said yoke sleeve and being actuated by the said handwheel through said driving ring, the handwheel having a hub portion having a side aperture engageable by the said key portion of the lock carrying lug upon predetermined movement of the said lug, means for gripping the said lug to move the latter member in a direction parallel to the axis of said shaft whereby to selectively effect said rotatability or non-rotatability of the said handwheel relative to the said yoke sleeve, the said locking key portion being movable in a direction towards the said yoke whereby to disengage said handwheel hub portion from the lock key portion to inhibit actuation of the said shaft by said handwheel.

7. The combination in a valve lock, a lock supporting yoke member, a threaded sleeve therefor journally mounted in said yoke member, a lock carrying lug on the supporting member having a locking key portion for the lock, a driving ring rotatable with the threaded sleeve and having peripherally arranged laterally positioned notch means for engagement by the locking key portion of the said lug, rotatable means mounted on the said threaded sleeve, a shaft threadedly received within and actuated by the said threaded sleeve upon movement of said rotatable means, the said rotatable means having a central portion with a lateral aperture engageable by the said key portion of the lock carrying lug upon predetermined movement of the said lug in a direction towards the said rotatable means and parallel to the axis of said shaft, at least a portion of said lock carrying lug in said latter position being received within said rotatable means.

8. In a valve locking mechanism of the character described, the combination of a lock and lock supporting yoke member, a threaded yoke sleeve therefor axially immovable relative to said yoke member, a lock carrying lug having a locking key portion for the lock, the said lug being axially movable relative to said yoke sleeve, a driving ring around the yoke sleeve rotatable with the latter member and having laterally positioned apertured means for engagement by the locking key portion of the said lug, spoked handwheel means mounted on the said yoke sleeve, a shaft received within and actuated by the said yoke sleeve in cooperation with the said handwheel means and driving ring, the said handwheel means having a hub portion with a side aperture engageable by the said key portion of the lock carrying lug upon said axial movement of the said lug, the said lug at one limit of transverse movement thereof being receivable between the spokes of said handwheel means, the said lock supporting yoke member having means to predeterminately receive the said locking key portion whereby in the said latter position the said key portion is disengaged from the side aperture of the hub portion of the handwheel means to enable said handwheel means to rotate freely relative to said driving ring and yoke.

9. In a valve locking mechanism or the like, the combination of a lock and lock supporting yoke member, a threaded yoke sleeve therefor rotatable in said yoke member, a lock carrying lug having a locking key portion for the lock, a driving ring rotatable with the sleeve and having at least a laterally positioned aperture for engagement by the locking key portion of the said lug, a handwheel with a hub rotatably mounted on the said yoke sleeve, a threaded shaft within the yoke sleeve and actuated by the said handwheel in cooperation with the said yoke sleeve and driving ring, the said handwheel having a side relieved portion in the hub engageable by the said key portion of the lock carrying lug upon predetermined axial movement of the said lug, and cover means for said handwheel at least overlying said side relieved portion, the said lock supporting yoke member having a relieved portion to predeterminately receive the said locking key portion whereby in the latter position the said locking key portion is disengaged from the handwheel side relieved hub portion to permit the handwheel to rotate freely relative to the yoke sleeve and driving ring to inhibit actuation of the shaft by the handwheel.

10. In a clutch type of valve locking mechanism or the like, the combination of a lock and a lock supporting member comprising a yoke, a sleeve rotatable within said yoke, the mechanism including a carrying lug for the lock with a locking key portion therefor, a driving ring rotatable with the said sleeve and having at least a single side positioned aperture for engagement by the locking key portion of the said lug, actuating means mounted on the said sleeve for rotation therewith, a shaft within the sleeve movable by the said actuating means through the said driving ring upon rotation of the latter member, the actuating means having a hub portion interrupted by a side aperture engageable by the said key portion of the lock carrying lug upon predetermined axial movement of the said lug relative to said yoke sleeve whereupon the said driving ring and actuating means are rotatable as a unit with said yoke sleeve to move the said shaft.

References Cited in the file of this patent
UNITED STATES PATENTS

| | | |
|---|---|---|
| 1,359,921 | Vanderlip | Nov. 23, 1920 |
| 1,427,934 | Bell | Sept. 5, 1922 |
| 1,464,635 | Berlien | Aug. 14, 1923 |
| 1,580,881 | Ganz | Apr. 13, 1926 |